(12) United States Patent
Chisenga et al.

(10) Patent No.: US 9,276,409 B2
(45) Date of Patent: Mar. 1, 2016

(54) SOLAR PHOTOVOLTAIC SYSTEMS

(75) Inventors: Lesley Chisenga, Redwood Shores, CA (US); Paul Randal Engle, Jr., Colorado Springs, CO (US); Gehan Anil Joseph Amaratunga, Cambridge (GB); Andrew John Matthews, Buntingford (GB)

(73) Assignee: SOLARCITY CORPORATION, San Mateo, CA (US)

( * ) Notice: Subject to any disclaimer, the term of this patent is extended or adjusted under 35 U.S.C. 154(b) by 1040 days.

(21) Appl. No.: 13/244,144

(22) Filed: Sep. 23, 2011

(65) Prior Publication Data

US 2012/0161528 A1     Jun. 28, 2012

(30) Foreign Application Priority Data

Jan. 18, 2011    (GB) .................................. 1100798.6

(51) Int. Cl.
*H02J 1/00* (2006.01)
*H02J 3/38* (2006.01)
(52) U.S. Cl.
CPC ............... *H02J 3/383* (2013.01); *Y02E 10/563* (2013.01); *Y10T 307/707* (2015.04)
(58) Field of Classification Search
CPC .................................. H02J 3/38; H02J 3/383
USPC ..................................................... 307/80, 82
See application file for complete search history.

(56) References Cited

U.S. PATENT DOCUMENTS

| | | | |
|---|---|---|---|
| 4,104,687 A | 8/1978 | Zulaski | |
| 4,626,983 A | 12/1986 | Harada et al. | |
| 5,576,941 A | 11/1996 | Nguyen et al. | |
| 5,708,576 A | 1/1998 | Jones et al. | |
| 6,151,234 A | 11/2000 | Oldenkamp | |
| 6,281,485 B1 | 8/2001 | Siri | |
| 6,311,137 B1 | 10/2001 | Kurokami et al. | |
| 6,339,538 B1 | 1/2002 | Handleman | |

(Continued)

FOREIGN PATENT DOCUMENTS

| | | |
|---|---|---|
| EP | 2337184 | 6/2011 |
| EP | 12708049.7 | 2/2014 |

(Continued)

OTHER PUBLICATIONS

Author Unknown, "DC Combiner Box Enables Better Awareness for Active Management," SolarMagic DC Monitoring Combiner Box Specifications, Apr. 2011, 2 pages, National Semiconductor Corporation.

(Continued)

*Primary Examiner* — Jared Fureman
*Assistant Examiner* — Alfonso Perez Borroto
(74) *Attorney, Agent, or Firm* — ADELI LLP

(57) ABSTRACT

Improved techniques for photovoltaic power generation are described. Inverter failure is can be a significant problem in solar photovoltaic systems as it can lead to loss of opportunity to harvest energy. A solar photovoltaic (PV) power generation system is described comprising solar PV panels and power conditioning units. A dc power distribution bus is coupled to the solar PV panels and the power conditioning units to switchably share dc power from the solar PV panels between the power conditioning units. Power distribution controllers detect a faulty power conditioning unit and reroute power from a solar PV panel coupled to the faulty power conditioning unit to other power conditioning units via the dc distribution bus.

20 Claims, 4 Drawing Sheets

(56) References Cited

U.S. PATENT DOCUMENTS

| | | | |
|---|---|---|---|
| 6,800,964 B2* | 10/2004 | Beck | 307/126 |
| 6,949,843 B2 | 9/2005 | Dubovsky | |
| 8,212,408 B2* | 7/2012 | Fishman | H02J 3/36 |
| | | | 307/43 |
| 8,736,111 B2* | 5/2014 | Song | H02J 3/383 |
| | | | 307/125 |
| 2001/0023703 A1 | 9/2001 | Kondo et al. | |
| 2008/0238195 A1* | 10/2008 | Shaver | H02H 9/041 |
| | | | 307/18 |
| 2009/0020151 A1 | 1/2009 | Fornage | |
| 2009/0021877 A1 | 1/2009 | Fornage et al. | |
| 2009/0141522 A1* | 6/2009 | Adest | H02J 1/102 |
| | | | 363/55 |
| 2009/0183760 A1 | 7/2009 | Meyer | |
| 2010/0289337 A1 | 11/2010 | Stauth et al. | |
| 2010/0309695 A1 | 12/2010 | Fornage | |
| 2011/0031816 A1 | 2/2011 | Buthker et al. | |
| 2011/0197945 A1* | 8/2011 | Schaacke | 136/244 |
| 2012/0043988 A1* | 2/2012 | Ramsey et al. | 324/761.01 |
| 2012/0098336 A1 | 4/2012 | Gurunathan et al. | |
| 2013/0026844 A1 | 1/2013 | Mitsuoka et al. | |

FOREIGN PATENT DOCUMENTS

| | | |
|---|---|---|
| EP | 2666222 | 4/2014 |
| GB | 2444528 | 6/2008 |
| GB | 2485423 | 5/2012 |
| GB | 1100798 | 2/2013 |
| GB | 1100798 | 10/2013 |
| GB | 1100798.6 | 5/2014 |
| JP | 2002-073184 | 3/2002 |
| WO | WO 2004/001942 | 12/2003 |
| WO | WO 2004/006342 | 1/2004 |
| WO | WO 2005/076444 | 8/2005 |
| WO | WO 2010/062410 | 6/2010 |
| WO | WO 2011/129188 | 10/2011 |
| WO | PCT/GB2012/050100 | 5/2012 |
| WO | WO 2012/098392 | 7/2012 |
| WO | PCT/GB2012/050100 | 8/2013 |

OTHER PUBLICATIONS

Author Unknown, "SolarMagic power optimizer; Integrated Smart Panel Chipset Maximizes PV System Efficiency at the Lowest Cost per kWh," SM3320-1A1 Power Optimizer Specifications, Sep. 2010, 2 pages, National Semiconductor Corporation.

Meinhardt, Mike, et al., "Multi-String-Converter with Reduced Specific Costs and Enhanced Functionality," May 21, 2001, pp. 217-227, Solr Energy vol. 69, Nos. 1-6, Elsevier Science Ltd., Great Britain.

* cited by examiner

SOLAR PHOTOVOLTAIC SYSTEMS

CLAIM OF BENEFIT TO PRIOR APPLICATIONS

This application claims benefit of an earlier-filed United Kingdom Patent Application 1100798.6, filed Jan. 18, 2011, now published as United Kingdom Patent Publication GB2485423, which is incorporated herein by reference.

FIELD OF THE INVENTION

This invention relates to improved techniques for photovoltaic power generation.

BACKGROUND TO THE INVENTION

Inverter failure is can be a significant problem in solar photovoltaic systems as it can lead to loss of opportunity to harvest energy. The problem is even more pronounced in central and string inverter systems where failure of the inverter can end the opportunity to harvest energy for the entire system. The problem of failure in micro-inverter systems is less severe because energy harvest is localised. However, even in such systems the energy loss due to failure to harvest, in failed parts of the system, may be significant depending on down time, size of system and number of failures.

There is therefore a need to address this problem to provide solar photovoltaic systems resilient to inverter failure.

Background prior art can be found in: WO2010/062410A1; WO2005/076444A1 and WO2004/001942A1.

SUMMARY OF THE INVENTION

According to a first aspect of the invention there is provided a solar photovoltaic (PV) power generation system comprising: a plurality of solar PV panels each having a dc output for delivering dc power; a plurality of power conditioning units each having a dc power input coupled to said dc output of said respective one of said plurality of solar PV panels and an ac mains power supply output for delivering an ac mains supply; a dc power distribution bus coupled to said plurality of solar PV panels and said plurality of power conditioning units to share dc power from said plurality of solar PV panels between said plurality of power conditioning units; and a plurality of power distribution controllers for controlling distribution of said dc power; wherein each of said plurality of power conditioning units is coupled to a respective one of one of said plurality of solar PV panels; wherein each of said plurality of power conditioning units is further coupled to a respective one of a plurality of power distribution controllers; and wherein each of said plurality of power distribution controllers comprises a fault detector to detect a faulty one or more of said plurality of power conditioning units, and responsive to said detecting a faulty one or more of said plurality of power conditioning units to distribute said dc power from said dc output of said solar PV panel coupled to said faulty one or more of said plurality of power conditioning units to others of said plurality of power conditioning units via said dc distribution bus.

The solar photovoltaic (PV) power generation system provides resilience to failure. A plurality of solar PV panels are each connected to a power conditioning unit (inverter) so that energy generated by the array of solar photovoltaic modules can be shared amongst the inverters as and when necessary. In the event of an inverter failure (such as a short circuit or the inverter ceasing to feed energy into the grid) the remaining inverters on the system can then harvest the extra energy made available. This allows the system to capture all of the available energy from the array off solar PV panels even when one of the inverters (or even several of the inverters) on the system experience failure. Normally functioning inverters access energy generated by other solar PV modules on the system using a dc power distribution coupled to the solar PV panels and the power conditioning units. Control of the power distribution is implemented by a plurality of power conditioning controllers which each control the switching and connection of the dc distribution bus to the local solar PV panel and inverter. It will be appreciated however that in alternative embodiments a centralised controller may also be used to control all of the switches although in doing so the modularity of the system may be lost. Power distribution can be controlled in the event of a detection of a failure of one of the inverters by the power distribution controller, for example upon detection of a short circuit failure.

Preferably in the solar PV power generation system the first of the plurality of solar PV panels is coupled to a first of the plurality of power conditioning units, furthermore a first of the power conditioning units is also coupled to a first of the plurality of power distribution controllers. Connection to the dc distribution bus for the first solar PV panel is via switched connection to the dc distribution bus which is controlled by the power distribution controller. On detection of a fault in the connected inverter the first of the plurality of the power distribution controllers closes the first switch connection to couple the first solar PV panel to the dc distribution bus to distribute the power from the first solar PV panel. This allows the harnessed power generated by the first solar PV panel to be collected and used by other inverters upon connection to the dc bus. This ensures the system works as efficiently as possible and avoids wastage of any energy generated by the first solar PV panel if the inverter it is connected directly to should fail.

In some preferred embodiments the first of the plurality of solar PV panels is coupled to the first power conditioning unit and, furthermore, the first power conditioning unit is also coupled to first of the plurality of power distribution controllers. In this second arrangement the first of the plurality of solar PV panels is coupled to the dc distribution bus via a diode rather than a switch as previously described. Dc power is thus constantly routed to the dc distribution bus so that an additional inverter can switch in the dc distribution bus to harness the additional power available.

Preferably one or more others of the plurality of power conditioning units (inverters) are coupled to the dc distribution via a respective second switched connection. In this arrangement the second switch connections allow power to be received from the dc distribution bus (routed to the bus via the first switch connection or the diode from the first of the plurality of solar PV panels) to be routed through to the other power conditioning units in order for the energy to be harnessed and converted into ac mains power. The other power distribution controllers are operable to close the respective second switch connection on the others of the plurality of power distribution controllers to couple the dc distribution bus to the other power conditioning units. This may be done by sensing a fault in the first of the plurality of power conditioning units so that the connection is only made as and when necessary. A variety of different sensing methods are possible, include detecting a characteristic signal on the dc distribution bus of via many other forms of commonly known communications methods.

In some preferred embodiments the first of the plurality of power distribution controllers may comprise a communications output to transfer fault data to other power conditioning units. Transmitted data may comprise of fault data signalling the presence of a fault in the first power conditioning units. Data may simply indicate that a failure has occurred or further detail may be provided such as information related to the available power generated from the solar PV panel—such data may be used by other inverters to assess whether they should switch in this solar PV panel to absorb spare capacity. In this arrangement the sensing comprises detecting the fault data transmitted from the first of the plurality of power distribution controllers (which signals the presence of a fault in the first of the plurality of power conditioning units).

In some preferred embodiments the transmitting of fault data comprises broadcasting fault data from the power distribution controller to the other power distribution controllers such that they all receive this information and individually determine whether they should act upon the information received. Such actions may be dependent upon the data received and one or more of the other power distribution controllers may opt to enable receipt of spare dc power from the distribution bus to route through to their connected power conditioning unit. Alternatively the transmitting may comprise transmitting the fault data to a central controller or a gateway controller which may be configured to monitor and control one or more of the elements of the solar PV power generation system. The central controller may subsequently transmit fault data to one or more others of the plurality of power distribution controllers having received the fault data from the first power distribution controller. This central controller may accordingly determine which of the other inverters are to be used to harness the spare dc power and this may vary over time for example, or may be to optimise efficiency in the system for example. To provide such features the power distribution controllers may each comprise an RF transceiver to transmit and receive the fault data. Alternatively if the power conditioning unit includes an RF transceiver in order for it to be controlled via central controller then in alternative embodiments the power distribution controller may use the RF transceiver integrated into the power conditioning unit in order to transmit and receive data and therefore reduce the overall system costs.

In some preferred embodiments of the solar PV power generation system the first of the plurality of solar PV panels are coupled to the first of the plurality of power conditioning units via a third switched connection. This third switch connection can be used to disconnect the power conditioning unit from the solar PV panel by opening the third switch. Opening of the third switch is responsive to a fault detector in the power distribution controller (or separate to the power distribution controller) detecting a faulty first of the plurality of power conditioning units. This ensures the power conditioning unit can be isolated from the rest of the system should the failure (for example a short circuit) to ensure that it does not impact on the rest of the system. Other forms of failures, for example if the power conditioning unit fails to generate an ac mains output but which do not directly impact the rest of the solar PV system may not need to result in this third switch being opened.

According to a second aspect of the invention there is provided a fail-safe solar PV power conversion unit for use in a solar PV power generation system, the fail-safe solar PV power conversion unit comprising: a dc input for receiving dc power from a solar PV panel; a power conditioning unit coupled to said dc input to receive said dc power and ac mains power supply output for delivering an ac mains supply; a dc power distribution bus coupled to said dc input and to said power conditioning unit and to a dc power distribution port, said dc power distribution port, when coupled to others of said fail-safe solar PV power conversion units, being operable to share dc power from said dc power distribution bus; and a power distribution controller coupled to said power conditioning unit for controlling distribution of said dc power; wherein said power distribution controller comprises a fault detector to detect a fault in said power conditioning unit and responsive to said fault detector detecting a fault to distribute said dc power from said dc input to said dc distribution port via said dc power distribution bus.

The solar PV power generation system may be formed from a series of modular systems each including a fail-safe solar PV power conversion unit, each fail-safe solar PV power conversion unit comprising a power conditioning unit, a power distribution controller and a dc power distribution bus that can be interconnected to the dc distribution bus in other modules. Each module may then be connected to a solar PV panel. By providing fault detection within the module each module is able to protect a fault occurring within its own power conditioning unit and safely deactivate the power conditioning unit or disconnect it such that it does not impact on the rest of the system.

Multiple instances of the failsafe solar PV power conversion unit may be connected together via the dc distribution bus to allow power to be distributed to other fail-safe units. Modules are fail-safe because they are each configured to disconnect the power conditioning unit in the presence of a failure to prevent subsequent damage to other components of the system. When connected to other modules a fault tolerance system is formed able to tolerate one or more failures.

According to further aspect of the invention there is provided a fault tolerant solar PV power generation system comprising: a first solar PV panel having a dc output for delivering power; a first power conditioning unit (PCU) having a dc power input coupled to said dc output of said first solar PV panel and an ac mains power supply output for delivering an ac mains supply, wherein said dc power input of said first power conditioning unit is coupled to said dc output of said first solar PV panel via a first PCU switch; a first power distribution controller (PDC) for controlling distribution of said dc power from said first solar PV panel, wherein said first PDC is coupled to said dc output of said first solar PV panel; a second solar PV panel having a dc output for delivering power; a second PCU having a dc power input coupled to said dc output of said second solar PV panel and an ac mains power supply output for delivering an ac mains supply, wherein said dc power input of said second power conditioning unit is coupled to said dc output of said first solar PV panel via a second PCU switch; a second PDC for controlling distribution of said dc power from said second solar PV panel, wherein said second PDC is coupled to said dc output of said second solar PV panel; a dc power distribution bus (PDB) coupled to said first and said second solar PV panels and said first and said second PCUs to share dc power from said first and said second solar PV panels between said first and said second PCUs, wherein said dc PDB is coupled to said first solar PV panel and said first PCU via a first PDB switch and wherein said dc PDB is coupled to said second solar PV panel and said second PCU via a second PDB switch; wherein said first PDC comprises a fault detector to detect a fault in said first PCU, and responsive to said detecting a fault said first PDC is configured to close said first PDB switch to connect said second solar PV panel to said dc PDB; and wherein said second PDC comprises a dc sense circuit to detect a dc voltage on said dc PDB, and responsive to said detecting a dc voltage on said dc PDB said second PDC is configured to close said second PDB switch to connect said dc PDB to said second PCU.

In this arrangement each of the solar PV panels is connected to a power conditioning unit and a power distribution controller is connected between the solar PV panels and power conditioning units to sense/detect a failure in the power conditioning unit. A first power distribution bus (PDB) switch provides connection from between the first solar PV panel and first power conditioning unit through to the power distribution bus so that on a failure being detected in the first power conditioning unit power may be distributed to the dc distribution bus. Similarly the second solar PV panel and second power conditioning unit are coupled by a second PDB switch connected between the second solar PV panel and second power conditioning unit which also connects to the dc distribution bus. When the first power conditioning unit has failed the second PDB switch may be closed to receive power routed to the power distribution bus via the first PDB switch to the second power conditioning unit via this second PDB switch. The PCU switches provide short circuit protection, enabling the respectively connected power conditioning units to be detected from the system in the presence of a short circuit.

The fault detector in one or both of the power distribution controllers (or separate to the power distribution controllers but still part of the system) may be a short circuit detector for example to detect a short between the dc rail inputs to the power conditioning unit. On detecting a short the corresponding power conditioning unit switch may be opened to prevent the short impacting remaining components of the system.

According to a still further aspect of the invention there is provided a fault tolerant solar PV power generation system comprising: a first solar PV panel having a dc output for delivering power; a first power conditioning unit (PCU) having a dc power input coupled to said dc output of said first solar PV panel and an ac mains power supply output for delivering an ac mains supply, wherein said dc power input of said first power conditioning unit is coupled to said dc output of said first solar PV panel via a first PCU switch; a first power distribution controller (PDC) for controlling distribution of said dc power from said first solar PV panel, wherein said first PDC is coupled to said dc output of said first solar PV panel; a second solar PV panel having a dc output for delivering power; a second PCU having a dc power input coupled to said dc output of said second solar PV panel and an ac mains power supply output for delivering an ac mains supply, wherein said dc power input of said second PCU is coupled to said dc output of said second solar PV panel via a second PCU switch; a second PDC for controlling distribution of said dc power from said second solar PV panel, wherein said second PDC is coupled to said dc output of said second solar PV panel; a dc power distribution bus (PDB) coupled to said first and said second solar PV panels and said first and said second PCUs to share dc power from said first and said second solar PV panels between said first and said second PCUs, wherein said dc PDB is coupled to said first solar PV panel via a first diode and wherein said dc PDB is coupled to said second solar PV panel via a second diode, and wherein said dc PDB is coupled to said first PCU via a first PDB switch and wherein said dc PDB is coupled to said second PCU via a second PDB switch; wherein said first PDC comprises a fault detector to detect a fault in said first PCU and responsive to said detecting a fault said first PDC is configured to transmit fault data signalling a faulty first PCU; and wherein said second PDC comprises a fault sense circuit configured to receive fault data signalling said faulty first PCU, and responsive to said fault data signalling said faulty first PCU said second PDC is configured to close said second PDB switch to connect said dc PDB to said second PCU.

In this alternative arrangement the first power distribution switch connects the dc distribution bus to the power conditioning unit on the detection of a fault in another of the power conditioning units. If a fault occurs in the first power conditioning unit then power, which is already routed through to the distribution bus via the diode is subsequently routed through to the second power conditioning unit via the second power distribution bus switch upon the second power distribution controller sensing a fault within the system. The sensing may be detecting a signal of a particular characteristic on the dc distribution bus for example, or alternatively may be by receiving a signal by a separate wired or wireless connection from the power distribution controller which has detected a failure. In addition the fault detector may comprise a short circuit detector to detect short circuit in the first power conditioning unit (or another power conditioning unit) and responsive to detecting the short circuit the first power distribution controller may subsequently open the first power conditioning unit switch to disconnect the dc power output of the first solar PV panel from the dc input of the first power conditioning unit to ensure that a short on the input to the first power conditioning unit does not affect the rest of the system.

BRIEF DESCRIPTION OF THE DRAWINGS

These and other aspects of the invention will now be further described, by way of example only, with reference to the accompanying figures in which.

DETAILED DESCRIPTION OF THE PREFERRED EMBODIMENTS

The embodiments show a solar photovoltaic module array connected to inverters, with the inverters being connected to the grid (mains electric grid). A number of connection schemes between inverters and solar modules on the array are possible, two of which are presented in the embodiments in FIGS. 1 and 2.

Figure 1:
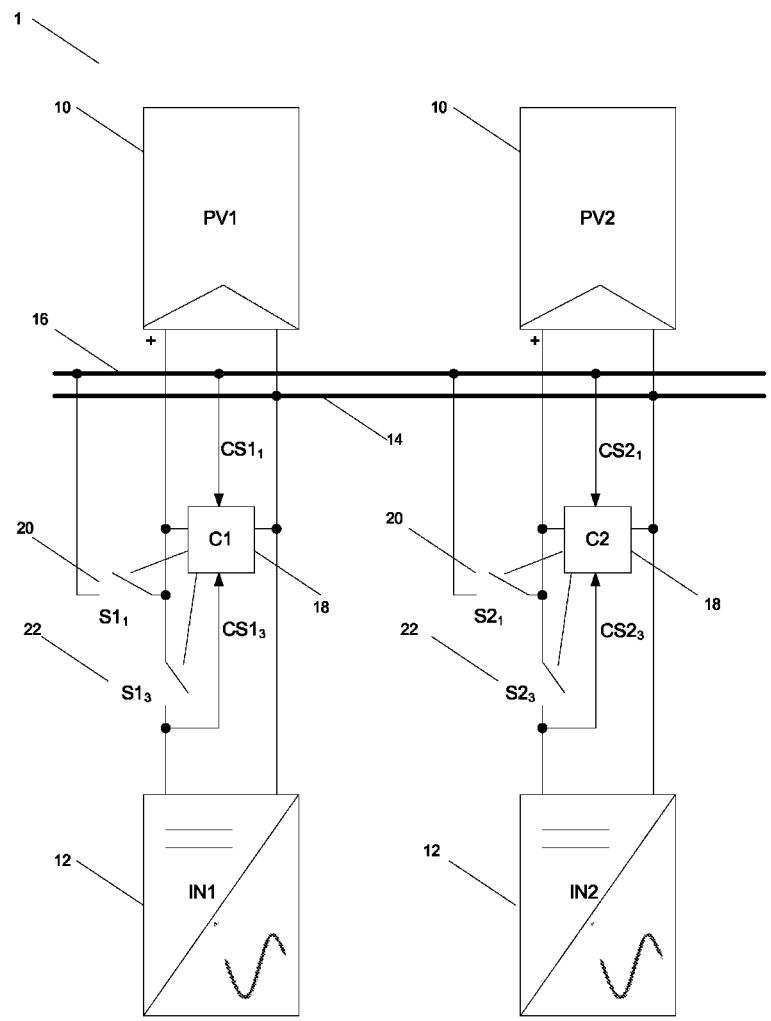
FIG. 1 shows a first embodiment of the solar PV power generation system.

Referring to FIG. 1, this shows an embodiment of the solar PV power generation system comprising solar PV panels 10 (PV1, PV2) and power conditioning units 12 (IN1, IN2). Further solar PV panels and power conditioning units may also be added and connected in the same manner as PV1 and PV2. Each solar PV panel (PV1, PV2) is coupled to a respective power conditioning unit (IN1, IN2) to transmit dc power from the solar PV panels to the respective power conditioning unit for conversion to an ac mains output. A power distribution controller 18 (C1, C2) is coupled between each solar PV panel and power conditioning unit pair and controls the opening and closing of switches connecting the power conditioning unit to the solar PV panel and the dc distribution bus 14 to the solar PV panel and power conditioning unit. The dc distribution bus 14 provides a path for distribution of dc power from one or more of the solar PV panels to one or more of the power conditioning units.

By way of example, in FIG. 1 power distribution controller C1 controls the switching of switch $S1_3$ to connect or disconnect the power conditioning unit IN1 from solar PV panel PV1. C1 also controls switch $S1_1$ to connect solar PV panel PV1 to the dc distribution bus 14 (if switch $S1_3$ were also closed, then the dc distribution bus would also be connected to IN1). Similarly power distribution controller C2 controls the switching of switch $S2_3$ to connect solar PV panel PV2 to power conditioning unit IN2 and switch $S2_1$ to connect or disconnect solar PV panel PV2 to dc distribution bus 14 (if switch $S2_3$ were also closed, then the dc distribution bus would also be connected to IN2). In this arrangement switch $S2_1$ provides a second switched connection to the dc distribution bus.

The power distribution controllers 18 (C1, C2) comprise fault detector to detect a fault in each of the respectively coupled power conditioning units. Power distribution controller C1, for example, can be used to detect a fault in power conditioning unit IN1. One useful fault detection mechanism is short circuit detection, which may be used to detect short in power conditioning unit IN1. Other forms of failure may also be detected by the controller (by probing or monitoring current and voltage characteristics for example) or may be detected internally by power conditioning unit IN1 and communicated to controller C1—in the latter case such communication may be to indicate that the power conditioning unit is no longer outputting ac mains power for example.

In some alternative embodiments the power distribution controller may be integrated into the power conditioning unit such that more detailed information on failure modes and operating conditions can be monitored and used to detect and configure the solar PV power generation system accordingly.

In the embodiment shown in FIG. 1 the power distribution controller C1 senses the voltage on the positive rail of the dc connection using signal $CS1_3$ between the solar PV panel PV1 and power conditioning unit IN1 to provide short circuit detection. On detection of a short circuit the power distribution controller opens switch $S1_3$ to disconnect the faulty power conditioning unit IN1 from the dc connection to solar panel PV1. To minimise generated power losses switch $S1_1$ is closed by power distribution controller C1 to connect solar PV1 to the dc distribution bus to make the power available to other power conditioning units.

It will be appreciated however that in some embodiments of the system it may not be necessary to incorporate switch $S1_3$ if the implementation chooses not to provide protection for short circuits in power conditioning unit IN1. For failure modes where power conditioning unit IN1 stops producing a dc output (without drawing excessive current due to a short circuit) or incorrectly generates an ac output there may be no need to disconnect the power conditioning unit IN1 from the solar PV panel PV1 and thus switch $S1_3$ need not be present or, if present, does not necessarily need to be opened, although it may be preferable to do so to ensure isolation of the power conditioning unit.

With switch $S1_1$ closed and dc power from solar PV panel PV1 routed through to the dc distribution bus, power distribution controller C2 senses the presence of a dc voltage on the dc distribution bus via sense signal $CS2_1$ and accordingly the corresponding power distribution controller C2 closes switch $S2_1$ to route dc power from the dc distribution bus through to power conditioning unit IN2. In such a configuration it will be appreciated that in order for the power conditioning unit IN2 to effectively use such dc power it will not already be operating at a maximum power output—preferably the power conditioning units will have spare capacity such that when one is disconnected others are able to harness the 'spare dc power' generated by solar PV panel PV1. Alternatively one or more spare power conditioning units may be coupled to the dc distribution bus and then brought on-line if one or more active power conditioning units ceases to work.

Figure 2:
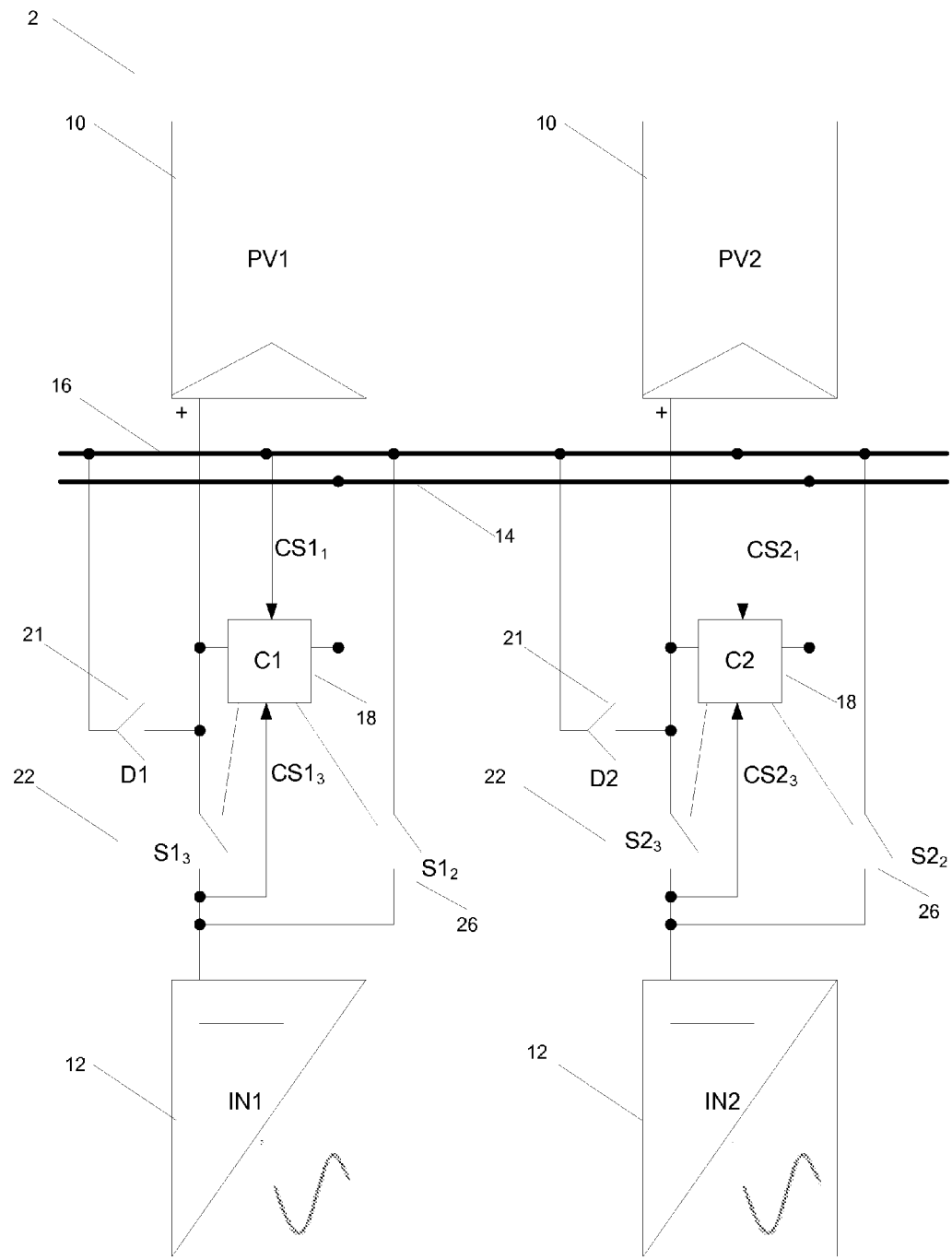
FIG. 2 shows a second embodiment of the solar PV power generation system.

FIG. 2 shows a second embodiment of the solar PV power generation system. In this arrangement switch $S1_1$ is replaced by diode D1 to direct dc power from solar PV panel PV1 to the dc distribution bus and switch $S2_1$ from FIG. 1 is also replaced by a diode, diode D2, to direct dc power from solar PV panel PV2 to the dc distribtution bus. As with the embodiment shown in FIG. 1 switches $S1_3$ and $S2_3$ control connection of each solar PV panel (PV1, PV2) to the respective power conditioning unit (IN1, IN2) and can be used to disconnect the respective power conditioning unit on detection of a short circuit (or any other forms of failure) by the respective power distribution controller.

Considering a failure in power conditioning unit IN1 for example, power distribution controller C1 now has no direct control over power delivery to the dc distribution bus as the switch $S1_1$ of FIG. 1 has been replaced with diode D1 and thus dc power from solar PV panel PV1 is always routed through to the dc distribution bus with a nominal voltage drop across the diode D1. On detection of a failure in power conditioning unit IN1 the power distribution controller communicates to other power distribution controllers that a fault has occurred and power is available to be harnessed by other power conditioning units, such as IN2 in FIG. 2. The communication may be via one of many different methods including:

Detecting a change in signal on the dc distribution bus (by overlaying the dc with a control signal for example); or Via direct communication from controller C1 to other controllers via a wired or wireless data link. In embodiments using wireless communication each of the power distribution controllers may communicate using any recognised wireless standard including Zigbee, Bluetooth, or WiFi for example although it will be appreciated that any form of wireless transmission protocol may be adopted; or Via communication from controller C1 to a gateway or central controller overseeing and monitoring the operation of all power conditioning units and subsequent retransmission via the gateway to one or more other power distribution controllers.

In some preferred embodiments the wireless communication channel may be part of the power conditioning units and so the power distribution controller may comprise existing mechanisms to communicate the presence of a fault. In embodiments where the power distribution control is integrated into the power conditioning unit again such facilities may be shared.

Switch $S1_2$ and $S2_2$ each connect the dc distribution bus to the respective power conditioning unit IN1 and IN2 (providing the second switched connection). The arrangement is similar to that of switches $S1_1$ and $S2_1$ in FIG. 1 in that the coupling is from the dc distribution bus to between the solar PV panel and power conditioning unit. In the embodiment shown in FIG. 2 however, because switches $S1_2$ and $S2_2$ are only used to route power to the power conditioning units they are coupled to the power conditioning unit side of switch $S1_3$ and $S2_3$. It will be appreciated however that the switches may be connected as arranged in FIG. 1.

On sensing a fault (detecting a fault, receiving via fault data via transmission, or monitoring of signal lines) controller C2 reads and processes the data and acts according to the received data. In FIG. 2, power distribution controller C2 closes switch $S2_2$ to connect the dc distribution bus to the power conditioning unit IN2 to enable power to be consumed by power conditioning unit IN2 to ensure that power generated from solar PV panel PV1 is converted into dc power to ensure the complete solar PV power generation system is operating at maximum output.

Although the embodiments described herein show fault detection occurring within the power distribution controllers it will be appreciated that external detection mechanisms may be implemented with control and error signals provided from and to the power distribution controllers. In alternative embodiments such control and error signalling may be administered centrally and the necessary signals distributed to the power distribution controllers accordingly.

Figure 3:
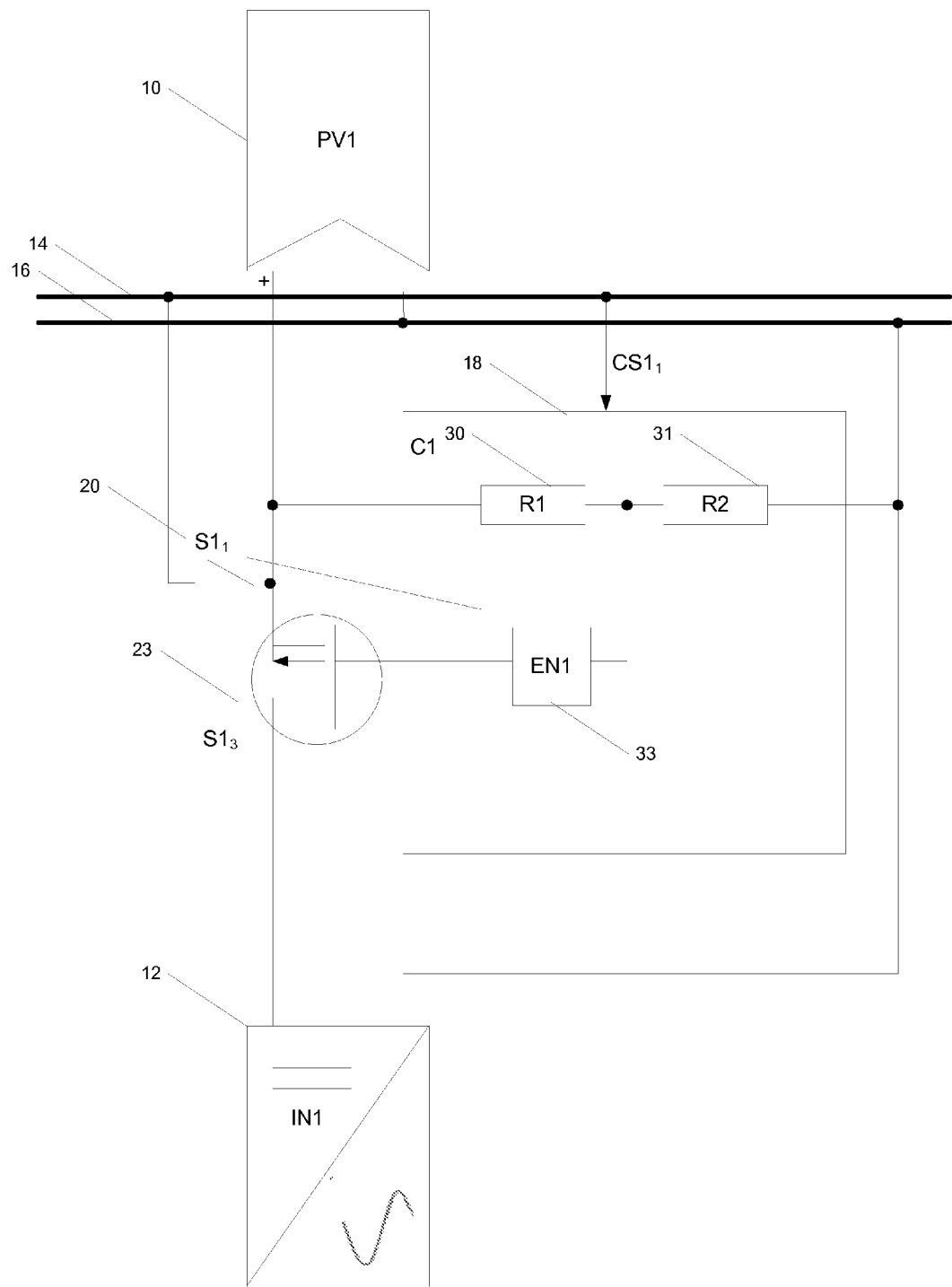
FIG. 3 shows an embodiment of the power distribution controller.

FIG. 3 shows a portion of a sample embodiment of power distribution controller C1 coupled to the solar PV panel PV1 and power conditioning unit IN1. As shown for switch $S1_3$, any of the switches may be implemented as transistor switches, such as MOSFET switches for example. The power distribution controller C1 controls transistor MOSFET switch $S1_3$ to disconnect the solar PV panel PV1 from power conditioning unit IN1 in the presence of a short circuit. The short circuit detector comprises a voltage divider circuit formed from resistors R1 and R2, with resistor R1 connected between the positive dc rail from solar PV panel PV1 and to resistor R2. Resistor R2 is connected to resistor R1 and to the ground or negative rail. In FIG. 3 the gate connection to the p-type MOSFET is connected between the resistors such that when the circuit is operating normally the voltage divider formed by R1 and R2 results in the gate voltage being lower than the source voltage so current flows through the MOSFET. A short circuit reduces the voltage difference between source and drain resulting in switch $S1_3$ effectively 'opening' to disconnect the solar PV panel PV1 from power conditioning unit IN1. The power distribution controller may also have further control elements (EN1 in FIG. 3) to control the switching, factoring in any fault data received by other power distribution controllers or central gateway control to control activation of any of the switches coupled to each respective power distribution controller. Such fault detection hardware, as previously described may detect a short circuit or other forms of failure or may also act upon data signals received from the power conditioning unit or any other components who may signal the presence of a fault.

Figure 4:
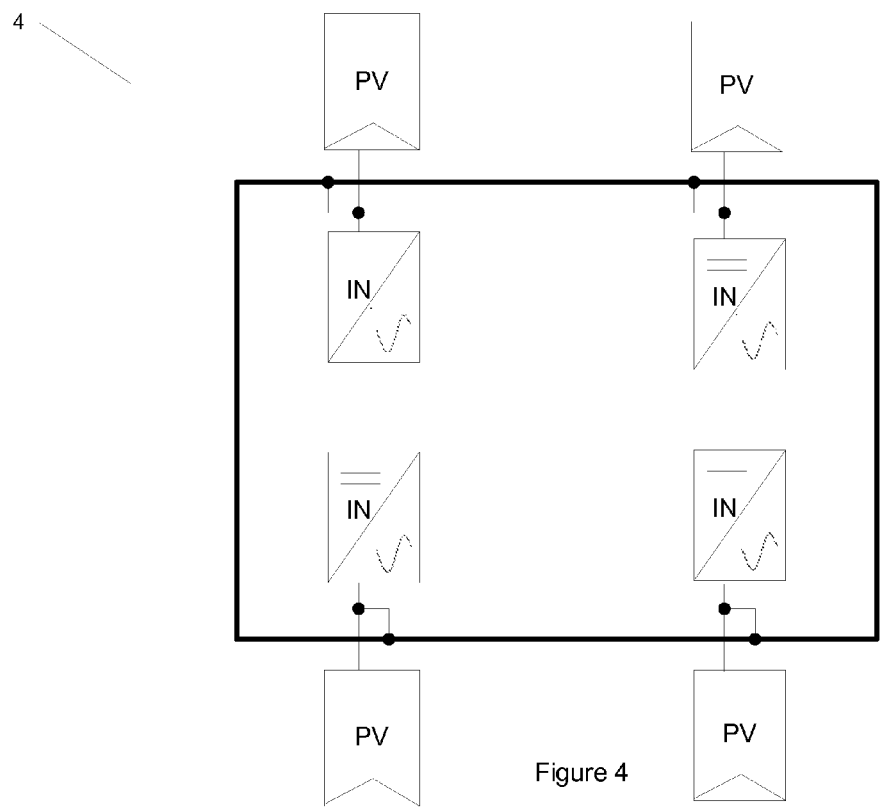
FIGS. 4 and 5 show alternate arrangements of the solar PV power generation system.
Figure 5:
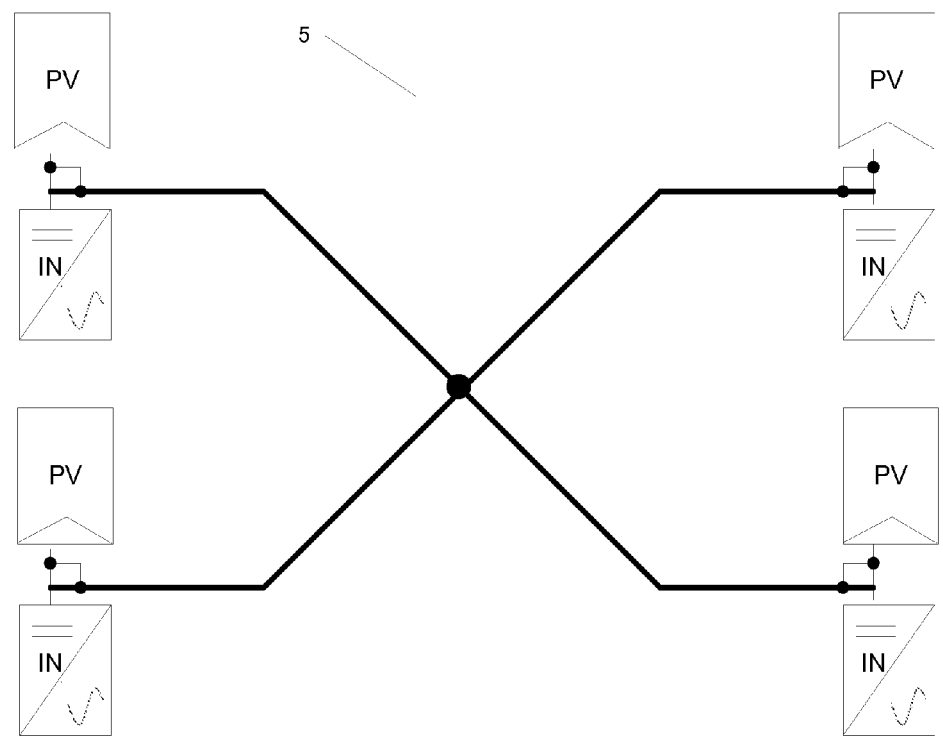

FIGS. 4 and 5 show alternative arrangements of the dc distribution bus, with FIG. 4 showing a ring type dc distribution bus and FIG. 5 showing a star type of configuration. It will be appreciated that the arrangement of the dc distribution bus and connections to the solar PV panels and power conditioning unit may be implementation dependent and the most useful configuration dependent on the physical arrangement of solar PV panels and power conditioning units within the system. (Switched connections/diodes are not shown on this diagram).

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A solar photovoltaic (PV) power generation system comprising:
   a plurality of solar PV panels, each comprising a dc output for delivering dc power;
   a plurality of power conditioning units, each comprising (1) a dc power input that is coupled to the dc output of a corresponding solar PV panel of the plurality of solar PV panels and (2) an ac mains power supply output for delivering an ac mains supply;
   a dc power distribution bus that is coupled to (1) each of the plurality of solar PV panels through a first switch for receiving dc power from the solar PV panel and (2) each of the plurality of power conditioning units through a second switch for distributing the received dc power to the power conditioning unit; and
   a plurality of power distribution controllers that are each coupled to a corresponding power conditioning unit, wherein each power distribution controller is configured to control the second switch of the corresponding power conditioning unit for receiving dc power from the dc power distribution bus,
   wherein each of the plurality of power distribution controllers comprises a fault detector that is configured to detect a faulty power conditioning unit, wherein, in response to detecting the faulty power conditioning unit, the power distribution controller is further configured to distribute the dc power from the dc output of the solar PV panel coupled to the faulty power conditioning unit to other power conditioning units of the plurality of power conditioning units via the dc distribution bus.

2. The solar PV power generation system of claim 1,
   wherein a first solar PV panel of the plurality of solar PV panels is coupled to a first power conditioning unit of the plurality of power conditioning units, and wherein the first power conditioning unit is coupled to a first power distribution controller of the plurality of power distribution controllers;
   wherein the first solar PV panel is coupled to the dc distribution bus through the first switch, and
   wherein, when a fault detector of the first power distribution controller detects a faulty first power conditioning unit, the first power distribution controller is configured to close the first switch in order to couple the first solar PV panel to the dc distribution bus.

3. The solar PV power generation system of claim 2,
   wherein at least one other power conditioning unit's corresponding power distribution controller is configured to close its respective second switch to couple the dc distribution bus to each of the at least one other power conditioning unit responsive to sensing a fault in the first power conditioning unit.

4. The solar PV power generation system of claim 3, wherein the sensing comprises detecting a signal on the dc distribution bus.

5. The solar PV power generation system of claim 4, wherein the sensing comprises sensing a dc voltage on the dc distribution bus.

6. The solar PV power generation system of claim 3, wherein the first power distribution controller comprises a communications output configured to transmit fault data signaling the faulty first power conditioning unit, and wherein the sensing comprises detecting the fault data.

7. The solar PV power generation system of claim 6, wherein transmitting fault data comprises broadcasting the fault data to the at least one other power conditioning unit's corresponding power distribution controller.

8. The solar PV power generation system of claim 7, wherein transmitting fault data comprises first transmitting the fault data to a central controller and then transmitting the fault data to the at least one other power conditioning unit's corresponding power distribution controller using the central controller.

9. The solar PV power generation system of claim 7, wherein the plurality of power distribution controllers each comprises an RF transceiver and the transmitting comprises wirelessly transmitting the fault data.

10. The solar PV power generation system of claim 2, wherein the first solar PV panel is coupled to the first power conditioning unit via a third switch, and
wherein the first power distribution controller is configured to open the third switch in order to disconnect the first solar PV panel from the first power conditioning unit responsive to the fault detector in the first power distribution controller detecting the faulty first power conditioning unit.

11. The solar PV power generation system of claim 10, wherein the fault detector in the first power conditioning unit comprises a short-circuit detector.

12. The solar PV power generation system of claim 1, wherein a first solar PV panel of the plurality of solar PV panels is coupled to a first power conditioning unit of the plurality of power conditioning units, wherein the first power conditioning unit is coupled to a first power distribution controller of the plurality of power distribution controllers, and wherein the first solar PV panel is coupled to the dc distribution bus via a diode.

13. A fault tolerant solar photovoltaic (PV) power generation system comprising:
a plurality of solar PV conversion units configured to harvest solar energy, each solar PV conversion unit comprising:
a solar PV panel comprising a dc output for delivering dc power;
a power conditioning unit comprising (1) a dc power input coupled to the dc output of the solar PV panel and (2) an ac mains power supply output for delivering an ac mains supply, wherein the dc power input of the power conditioning unit is coupled to the dc output of the solar PV panel via a first switch of the PV conversion unit; and
a power distribution controller configured to control distribution of the dc power from the solar PV panel, wherein the power distribution controller is coupled to the dc output of the solar PV panel;
a dc power distribution bus that is coupled to (1) each solar PV panel through a second switch of the corresponding PV conversion unit for accepting dc power from the solar PV panel and (2) each power conditioning unit through a third switch of the corresponding PV conversion unit, wherein the dc power distribution bus is configured to share dc power between the plurality of solar PV conversion units.

14. The fault tolerant solar PV power generation system of claim 13, wherein each power distribution controller of the plurality of solar PV conversion units comprises at least one of:
a fault detector configured to detect a fault in the power conditioning unit, wherein, when a fault is detected by the fault detector, the power distribution controller is configured to close the second switch in order to connect the solar PV panel to the dc power distribution bus; and
a dc sense circuit configured to detect a dc voltage on the dc power distribution bus, wherein, when a dc voltage is detected by the dc sense circuit, the power distribution controller is configured to close the third switch in order to connect the dc power distribution bus to the power conditioning unit.

15. The fault tolerant solar PV power generation system of claim 14, wherein the fault detector comprises a short circuit detector configured to detect a short circuit in the power conditioning unit, and
wherein, when the short circuit detector of the power distribution controller detects a short circuit, the power distribution controller is configured to open the first switch in order to disconnect the dc power output of the solar PV panel from the dc input of the power conditioning unit.

16. The fault tolerant solar PV power generation system of claim 14, wherein, when the dc sense circuit of the power distribution controller detects a dc voltage on the dc power distribution bus, the power distribution controller is configured to keep the first switch closed in order for the power conditioning unit to capture dc power from the dc power distribution bus and the solar PV panel.

17. A method for distributing dc power to a plurality of power conditioning units through a dc distribution bus, the method comprising:
at each of the plurality of power conditioning units, receiving dc power from a corresponding solar photovoltaic PV panel, each power conditioning unit coupled to (1) the dc distribution bus through a first switch, (2) the corresponding solar photovoltaic (PV) panel through a second switch, and (3) a corresponding power distribution controller, wherein each solar PV panel is coupled to the dc distribution bus through a third switch;
detecting a faulty power conditioning unit of the plurality of power conditioning units with the corresponding power distribution controller; and
diverting the dc power of the faulty power conditioning unit's corresponding solar PV panel by (1) opening the second switch of the faulty power conditioning unit's corresponding solar PV panel and (2) closing the third switch of the corresponding solar PV panel to share dc power from the solar PV panel with a set of power conditioning units of the plurality of power conditioning units.

18. The method of claim 17, wherein diverting the dc power of the faulty power conditioning unit's corresponding solar PV panel further comprises opening the first switch that connects the faulty power conditioning unit to the dc distribution bus.

19. The method of claim 18 further comprises, for each power conditioning unit of the set of power conditioning units, closing the first switch in order to receive dc power from at least the faulty power conditioning unit's corresponding solar PV panel through the dc distribution bus.

20. The method of claim 17, wherein detecting a faulty power conditioning unit comprises detecting a short circuit in the faulty power conditioning unit.

* * * * *